J. WATSON.
Sugar Filter.
No. 3,419.
Patented Jan'y 31, 1844.
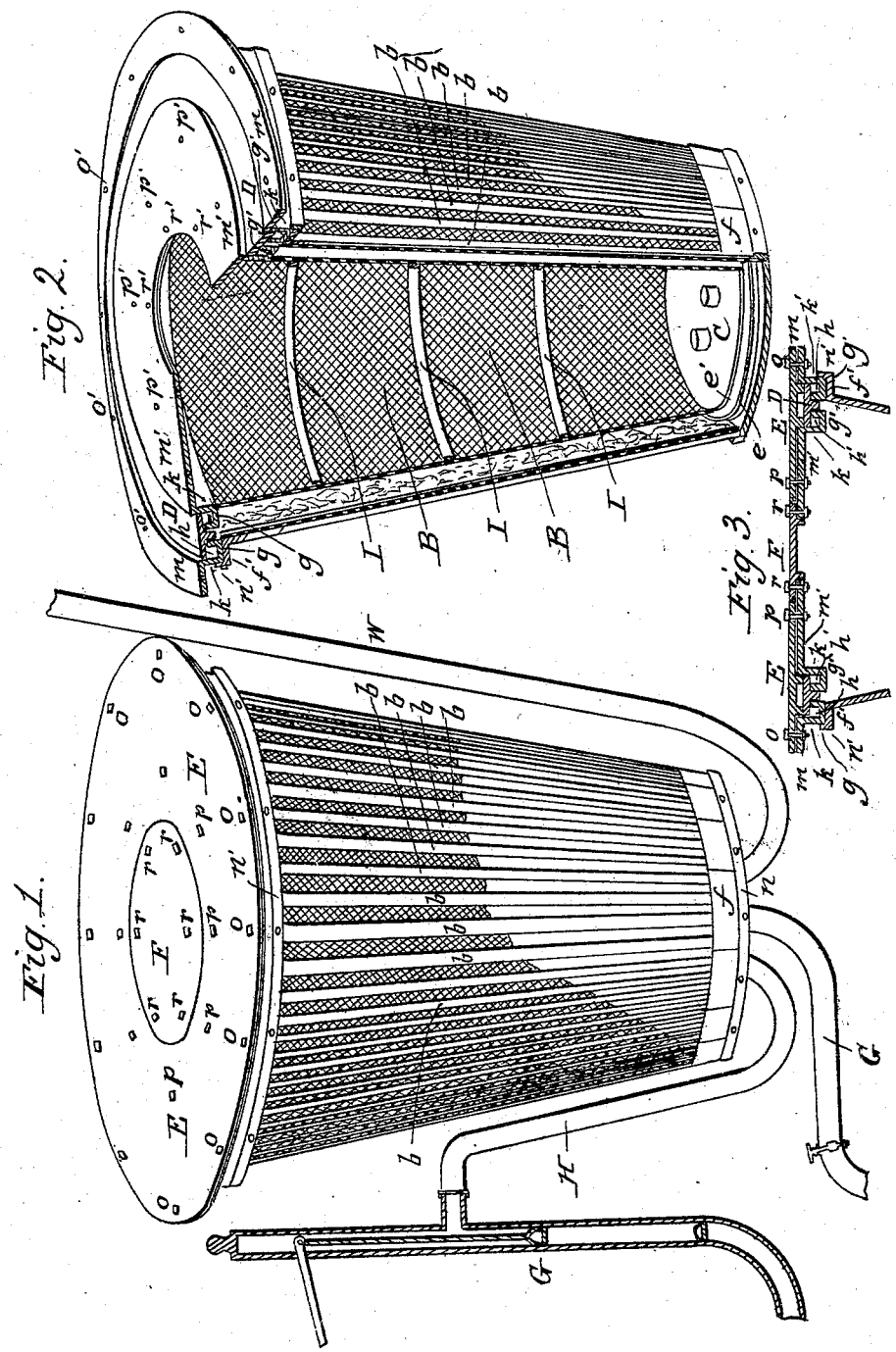

UNITED STATES PATENT OFFICE.

JOHN WATSON, OF ELIZABETHTOWN, NEW JERSEY.

FILTER FOR SUGAR, &c.

Specification of Letters Patent No. 3,419, dated January 31, 1844.

*To all whom it may concern:*

Be it known that I, JOHN WATSON, late of Chorley, in the county of Lancaster, England, now a resident of Elizabethtown, in the State of New Jersey, have invented a new and useful Improvement in the Construction of Filters Used in the Manufacture of Sugar, of which the following is a full and accurate description, reference being had to the accompanying drawings, making part of this specification.

Figure 1 is a view of my apparatus when complete representing a conical vessel formed of vertical bars $b\ b\ b$ connecting two circular horizontal rims $f\ f'$—the one marked $f$ surrounding the bottom plate and projecting a short distance above it, the other $f'$ surrounding the upper part of the vessel but not seen in Fig. 1 on account of a hoop $n'$ which encircles and conceals it but shown in the sectional drawings Figs. 2 and 3. These rims $f\ f'$ are cast in sections; the bars $b\ b\ b$ connecting the several sections being cast with them, and are hooped together when in place by the hoops $n\ n'$ as shown in Fig. 1 where the rim $f$ is shown constructed in this manner with the hoop $n$ encircling it. On the top of the vessel A there is an annular lid E secured at its outer edge to a horizontal rim $m$ surrounding the top of the vessel and a smaller lid F adapted to the circular opening in the center of the lid E the two lids entirely covering the vessel. A wire cloth lines the interior of the vessel A immediately within the bars $b\ b\ b$ and is seen in the spaces between the bars except where the wire is represented broken away in Fig. 1 showing a lining of cloth inside of it.

Fig. 2 is a sectional view of the apparatus in which the whole front portion of it is removed but leaving the bottom plate C entire showing an inner vessel of wire cloth marked B, the front of which is also removed to show its interior construction, supported on hoops I I I placed horizontally one over the other and forming a frame on which the wire is kept distended. Surrounding the whole of the inner vessel B there is a space filled with animal charcoal closed at bottom by the bottom plate C which closes both the inner and outer vessel and the space between them.

Fig. 3 is a section of the lids E F and the parts of the apparatus immediately connected with them. On the rim $f'$ encircling the vessel A another horizontal rim $g$ is placed and secured there by a hoop $n'$ shown in Fig. 1 and seen in section at Fig. 3 overlaying and confining both rims. Over the inner vessel B and within the rim last described a similar horizontal rim $g'$ is placed a space intervening between the rims $g\ g'$ as between the vessels A, B. To support the rim $g'$ (the wire cloth forming the inner vessel B not being sufficiently strong) temporary vertical supports are used, not shown in the drawing, which are removed when the lid E is placed on the vessel, screws passing from this lid into a horizontal plate $m'$ attached to the rim $g'$ securing the latter in place when the lid E is fastened down as hereafter described. On the upper surface of the rim $g$ two vertical plates are cast one marked $h$ surrounding its whole inner edge, another marked $k$ raised from its whole outer edge as shown in section at Fig. 3 the space between the plates $h\ k$ forming a groove for a purpose to be described. Two vertical plates are also raised on the upper surface of the rim $g'$ one marked $k'$ surrounding its inner edge another $h'$ raised along its whole outer edge a groove being formed by the space between the plates $h'\ k'$ as on the rim $g$ and for the same purpose. The vertical plates $k\ k'$ are nearly double the height of the plates $h\ h'$ as shown in Figs. 2 and 3 and are bent at right angles at their upper ends the plate $k$ outwardly so as to form a horizontal rim $m$ surrounding and projecting beyond it, the plate $k'$ in an inward direction forming a horizontal plate $m'$ with a circular opening in its center communicating with the interior of the vessel B as seen in Fig. 2.

When the apparatus is to be used the space between the vessels A and B is filled with animal charcoal up to the rims $g\ g'$. The grooves between the plates $h\ k$ and $h'\ k'$ are also filled with animal charcoal and an annular plate D Fig. 2 fitted into the space between the plates $k\ k'$, so as to rest on the top of the plates $h\ h'$ and the surface of the charcoal in the grooves already described a vertical projection cast on the whole of the lower surface of the plate D fitting into and filling up the space between the plates $h$ and $h'$ the charcoal in the grooves described acting as a packing to prevent the escape of the liquor in an upward direction. Over the plate D the lid E is fastened down and secured by screws $o\ o\ o$ passed through it near its outer edge, as shown in Fig. 1, into corresponding holes $o'$ $o'$ $o'$ in the horizontal rim $m$ Fig. 2 by means of which arrangement the space between the vessels A and B is completely covered. In the lid E near its inner edge there are screws also marked $p$ Fig. 1 which descend into holes $p'$ $p'$ in the horizontal plate $m'$, by which the rim $g'$ is sustained when the temporary supports under it are removed. The circular lid F fitting the opening in the center of the lid E is also secured in place by screws $r$ descending into holes $r'$ in the horizontal plate $m'$ as shown in Fig. 3 where a section of the lids E and F and the plates $m$ and $m'$ is shown with the method of securing them in place.

The circular bottom plate $c$ is shown in Fig. 2 with the lower rim $f$ encircling it. Inside of this rim and concentric with it and at equal distances from each other there are two horizontal circular rims $e$ $e'$ raised on the upper surface of the bottom plate $c$. Inside of the rim $e'$ and at a distance from it equal to that between it and the rim $e$ the whole inner portion of the plate $c$ is raised so as to be on a level with the top of the rims $e$ $e'$ around which elevation the lower margin of the vessel B is confined three grooves are formed by this arrangement into which the charcoal is pressed which prevents the liquor from escaping as it would if the bottom plate were flat on its upper surface. The lids being fastened the liquor is introduced into the inner vessel B by an ordinary force pump shown at G Fig. 1 through a tube H which enters the bottom plate C. There is a discharge tube $G'$ also for emptying the vessel B provided with a cock as seen in Fig. 1. To keep up a constant pressure in the vessel B after it has been filled there is a vertical tube $w$ which is several feet in height and bent at bottom to allow of its lower end entering the inner vessel B through the bottom plate $c$. This vertical tube $w$ is filled with liquor when the pump is in action which when the vessel has been supplied keeps up a pressure on the liquor in it forcing it through its sides of wire cloth and the animal charcoal surrounding it from whence it escapes by the spaces between the bars $b$ $b$ $b$ of the vessel A.

To keep the interior surface of the inner vessel B free I employ a revolving brush as shown at L Fig. 4 the brush being attached to a vertical shaft S the lower end of which is stepped on the bottom plate C the upper end passing through a stuffing box in the center of the lid F.

The advantage of my apparatus is that it presents a greater surface of animal charcoal to the action of the liquor in the same space than has been hitherto obtained. Another advantage is that a vertical surface of charcoal is acted on instead of a horizontal one, a vertical surface not being liable to become obstructed like the other from the impurities of the liquor settling upon it. The form of my apparatus is not of consequence. It may be made of a square cylindrical or other shape without varying the character of the invention. Instead of making the inner vessel B of wire cloth the order may be reversed and the liquor introduced into a close outer vessel having within it a vessel of wire cloth and within this again another vessel formed of vertical bars $b$ $b$ $b$ like the vessel A Fig. 1 with animal charcoal arranged between them the liquor being made in this arrangement to press inwardly and discharge at the center instead of outwardly as in my present plan.

The most important feature of my invention as I consider is the arrangement of the charcoal or filtering material between two vertical surfaces covered at top and bottom and formed of wire cloth or other open material allowing of the liquor to enter the charcoal in a lateral direction on one side and escape from it on the other.

What I claim as my invention and desire to secure by Letters Patent therefore is—

1. Employing charcoal for filtering purposes, between two vertical surfaces (or nearly vertical) of wire cloth or other porous material, the liquor to be filtered entering the charcoal through one of the vertical surfaces and escaping from it through the other as herein set forth.

2. I claim the method of constructing my apparatus by forming it of two vessels one within the other having animal charcoal in the space between them the said vessels being constructed and operating as herein set forth. I usually employ in combination with this arrangement a tube $w$ for producing by means of a column of liquor in it, a pressure on the surface of the liquor in the apparatus as herein described.

JOHN WATSON.

Witnesses:
T. W. DONOVAN,
S. N. SALOMON.